Nov. 16, 1965  B. MEDDINGS ETAL  3,218,192
PROCESS OF COATING PHOSPHORUS PARTICLES
WITH NICKEL AND/OR COBALT
Filed March 8, 1962
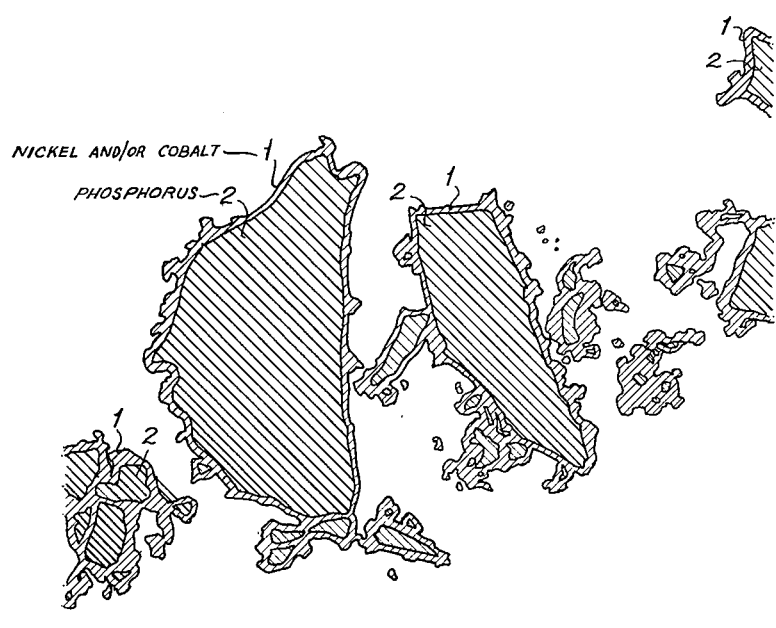
Inventors
Basil Meddings
D. J. I. Evans
by
Attorney United States Patent Office 3,218,192
Patented Nov. 16, 1965

3,218,192
PROCESS OF COATING PHOSPHORUS PARTI-
CLES WITH NICKEL AND/OR COBALT
Basil Meddings and David J. I. Evans, Fort Saskatchewan,
Alberta, Canada, assignors to Sherritt Gordon Mines
Limited, Toronto, Ontario, Canada, a company of
Canada
Filed Mar. 8, 1962, Ser. No. 178,511
6 Claims. (Cl. 117—100)

This invention relates to a process for the production of metal coated phosphorus particles and products produced thereby. It is particularly directed to a process for the production of individual phosphorus particles coated with at least one metal selected from the group consisting of nickel and cobalt in elemental form.

Processes are known in which metal phosphides are produced by mixing phosphorus in elemental form in a molten bath of the metal of interest. Another method is known in which particles of a base metal, such as copper, are mixed with particles of phosphorus in desired proportions. The resultant mixture is compacted into a desired shape which is heat treated at a temperature of, for example, about 260° C.

Several important problems are encountered which make it difficult and costly to produce metal phosphides which contain desired proportions or percentages of metal and phosphorus. One of the difficulties is that phosphorus has a very low boiling point, about 220° C. for red phosphorus, while the metal with which it is associated has a substantially high melting temperature. Red phosphorus is very reactive with oxygen at a temperature above 200° C. Thus, there is the problem of endeavouring to combine in desired proportions very highly volatile phosphorus with a molten bath of metal at a substantially higher temperature. This results in large losses of phosphorus, severe limitations on the types of metal-phosphorus compounds which can be produced, and the production of metal phosphorus products which do not meet market specification. A further problem is that by conventional processes, it is difficult, if not impossible, to produce a nickel-phosphorus compound which contains more than about 11% phosphorus by weight due, primarily, to the loss of phosphorus in the process of reacting the metal-phosphorus components.

An important objects of this invention is to provide a process for producing individual, metal coated phosphorus particles which contain the metal and phosphorus constituents in the desired proportions.

A further object is to produce metal coated phosphorus particles which can be handled, stored and shipped safely and in which the autogenous heat generated in forming a metal phosphide from the components can be usefully employed at the point of use of the particles.

A still further important object of this invention is to produce metal coated phosphorus particles in which each individual phosphorus particle is completely enclosed in a coating or envelope of at least one metal selected from the group consisting of nickel and cobalt sealed against contact with air and the metal and phosphorus are in their elemental forms having their individual and distinguishable characteristics without chemical combination.

An understanding of this invention and the manner in which the above and other objects thereof are attained can be obtained from the following description, reference being made to the accompanying drawing of phosphorus particles enclosed in a nickel coating, the phosphorus constituting 30%, by weight, of the particle and the nickel constituting 70%.

The manner in which the nickel coating 1 completely encloses the phosphorus particles 2 is clearly illustrated in this drawing.

Phosphorus exists in two main forms, white phosphorus, which also may be identified as yellow phosphorus, and red phosphorus. White phosphorus is very unstable and ignites spontaneously on exposure to air at about 34° C. Red phosphorus is stable. It ignites at about 240° C. and melts under pressure at about 595.5° C. It is preferred to use red phosphorus which is relatively stable on exposure to the atmosphere, as the nuclei of the composite metal-phosphorus particles of this invention.

The process of this invention comprises, in general, the steps of dispersing solid particles of elemental phosphorus having a melting point above about 90° C. in a solution which contains, in solution, at least one metal selected from the group consisting of nickel and cobalt, and a catalyst. The solution is reacted at a temperature above about 90° C. but below the melting point of the phosphorus particles with a sulphur-free reducing gas such as hydrogen at a partial pressure of reducing gas above about 10 pounds per square inch. The reducing reaction is continued to form a complete metal coating of desired thickness on each of the solid particles and produce metal coated phosphorus particles having a predetermined phosphorus-metal ratio. The reducing reaction is then terminated and the metal coated phosphorus particles are separated from the solution.

Elemental phosphorus is commercially available in a wide range of particle sizes and we have found that all these sizes can be coated satisfactorily by this process. The maximum size is determined, of course, by the capacity of the agitator assembly with which the pressure vessel is equipped, having regard to the fact that to obtain optimum coating results and a relatively uniform product, the particles should be maintained in suspension as a relatively uniform dispersion in the solution during the reducing reaction. We have obtained very satisfactory results in coating particles in a size within the range of from about 1 to about 400 microns. The surface area of the phosphorus particles exposed to the solution varies inversely with the size of the particles. That is, for a prescribed weight of product, smaller particles expose larger total surface areas and thus require larger amounts of metal to coat them than do larger particles. For any given size of phosphorus particle there is a minimum metal/phosphorus ratio that can be obtained while maintaining a complete metal coating on the particle. The minimum permissible metal/phosphorus ratio decreases as the particle size is increased. Thus, taking into account the limits imposed by particle size, the relative percentages by weight of metal and phosphorus can be varied over a wide range by providing in the solution a prescribed amount of metal to be precipitated and a prescribed amount of phosphorus particles to be coated.

The minimum amount of phosphorus which can be enclosed in metal is governed by the solubility of phosphorus in the solution. That is, a very minor amount of phosphorus may dissolve in the solution. Thus, for a high metal-low phosphorus content product, this must be taken into consideration in the size and the amount of the phosphorus particles dispersed in the solution. The minimum amount of metal which can be employed is that required to enclose each phosphorus particle completely in a coating which does not rupture in normal handling, transporting and storage. Also, phosphorus is a very light element and the metal which encloses the particles is substantially heavier. Having regard to these factors, we have found that composite metal-phosphorus particles can be produced which contain from a finite amount, about 0.5%, and up to about 40% phosphorus, the balance metal. Usually, it is desired to produce a product which contains from about 5% to about 40%, by weight, phosphorus, balance metal.

The solution in which the phosphorus particles are dispersed is an aqueous solution. Nickel and cobalt can be precipitated from an aqueous solution in which the metal is present as soluble, gas reducible ions by reacting the solution at elevated temperature and pressure with a reducing gas, such as hydrogen. As the reducing reaction is acid forming, it usually is necessary either to provide initially sufficient acid neutralizing agent, such as ammonia or sodium hydroxide, or add it during the progress of the reaction, to maintain the pH value of the solution above about pH 4.

The reaction is conducted in a pressure vessel, such as an autoclave, which is capable of withstanding pressures up to, for example, about 1000 pounds per square inch, and equipped with an agitator device.

The process of this invention is described as applied to the coating of individual phosphorus particles with at least one metal selected from the group consisting of nickel and cobalt and which is present in the solution as a dissolved salt. A solution is prepared which contains the metal or metals of interest with which the phosphorus particles are to be coated. This solution is charged into the pressure vessel. The vessel is then purged of air and the phosphorus particles are charged into the solution and are substantially uniformly dispersed therein by the action of the agitator. As the phosphorus particles may react in a hot solution under non-reducing conditions, it is preferred to charge them into a solution at a temperature below about 40° C. and heat the resulting slurry of solution and phosphorus particles to reaction temperature under a reducing atmosphere by the admission of reducing gas thereinto and thus minimize dissolution of the particles.

The solution is heated to reaction temperature which usually is within the range of from about 90° C. to about 260° C., preferably about 180° C., which is safely below the melting temperature of the phosphorus particles. A temperature below 90° C. can be employed but the reaction is too slow for a commercial operation. Also, a temperature of above 260° C. can be employed but relatively costly high pressure equipment would be required. The reaction proceeds at a satisfactory rate at a temperature within the range of from about 90° C. to about 260° C.

The partial pressure of reducing gas, which can be, for example, hydrogen, also can be varied over a wide range. We have found, when using hydrogen, that below about 10 pounds per square inch the reaction proceeds to slowly. The maximum pressure is dictated by the pressure capacity of the equipment employed. A satisfactory range, using hydrogen, is from about 50 to about 500 pounds per square inch.

As the phosphorus particles are active reducing agents, it is not necessary to provide a catalyst in the solution to effect precipitation of the dissolved metal. We have found, however, that the addition of a small amount, of the order of from about 0.01 to 1.0 gram per litre, of anthraquinone, or a substituted anthraquinone, benzoquinone, naphthoquinone, ortho- and para-polyhydric phenols, tannic acid and morin, is necessary to produce a uniform and continuous coating of metal on the individual phosphorus particles. Also, we have found that the addition of a small amount, for example 0.1 gram per litre, of a cationic surface active agent serves to improve the physical characteristics of the coating metal, particularly in the precipitation of cobalt as the coating metal. A suitable cationic surface active agent is a mixture of octadecyl amine and octadecyl guanidine salts of octadecyl carbamic acid reacted with ethylene oxide.

The following examples illustrate the operation of the process of this invention and the product produced thereby.

EXAMPLE 1

An aqueous solution which contained 45 grams per litre nickel, 300 grams per litre ammonium sulphate and 27 grams per litre free or unbound ammonia, and 0.1 gram per litre anthraquinone was charged into an autoclave equipped with an agitator. 11 grams per litre of red phosphorus of a particle size smaller than about 150 microns were dispersed in the solution which was at ambient temperature. Hydrogen, at a partial pressure of about 350 pounds per square inch, was fed into the autoclave. The solution was then heated to a temperature of about 180° C. The reducing reaction was continued until the nickel content of the solution was reduced to about 1 gram per litre. The metal coated phosphorus particles, after separation from the reacted solution, contained 80% nickel and 20% phosphorus. There was substantially no loss of phosphorus by dissolution or volatilization and there was no evidence of nickel depositing on the wall of the reaction vessel.

EXAMPLE 2

Example 1 was repeated with the difference that 17.5 grams of phosphorus were added per litre of solution. The resulting metal coated phosphorus particles contained 69.8% nickel and 29.3% phosphorus. A small amount of nickel deposited on the wall of the reaction vessel.

EXAMPLE 3

In a test to produce a metal-phosphorus product which contained 85% nickel, 6% cobalt and 9% phosphorus, an ammoniacal ammonum sulphate solution was prepared which contained 57.0 grams per litre nickel, 3.3 grams per litre cobalt, 6.0 grams per litre phosphorus in the form of particles of a size smaller than 44 microns, 100 grams per litre ammonium sulphate, and 38 grams per litre free ammonia. The solution was reacted at 180° C., with hydrogen at a partial pressure of 350 pounds per square inch. 0.2 gram per litre anthraquinone and about 0.5 gram per litre of a cationic surface active agent in the form of a mixture of octadecyl amine and octadecyl guanidine salts of octadecyl carbamic acid reacted with ethylene oxide, about 70% active ingredient in isopropyl alcohol and water, were added to the solution as addition agents. Nickel and cobalt were precipitated simultaneously from the solution. The resulting metal coated phosphorus particles analyzed 84.4% nickel, 5.9% cobalt and 9.3% phosphorus. This test illustrates the coprecipitation of a plurality of metals on to the exposed surfaces of the phosphorus particles.

The following Table 1 illustrates that very closely accurate proportions of metal and phosphorus can be obtained in the operation of the process of this invention. In each instance, with the exception of the cobalt coating, the solution contained 45.81 grams per litre nickel as nickel sulphate, 100 grams per litre ammonium sulphate, and 26 grams per litre free or unbound ammonia. The solution was reacted at 180° C. with hydrogen under a partial pressure of 350 pounds per square inch. Cobalt was deposited under the same conditions of treatment from a solution which contained 60 grams per litre cobalt as cobalt sulphate, 400 grams per litre ammonium sulphate and 40 grams per litre free ammonia. All percentages are by weight.

*Table 1*

| Objective | Product Analysis, Percent | | | |
|---|---|---|---|---|
| | Ni | Co | P | S |
| 85% Ni—15% P | 84.8 | | 14.8 | 0.011 |
| 80% Ni—20% P | 79.9 | | 19.5 | 0.011 |
| 75% Ni—25% P | 75.4 | | 23.8 | 0.033 |
| 85% Co—15% P | | 85.3 | 13.7 | 0.019 |

The product of the coating step is in the form of individual, metal coated phosphorus particles which are completely enclosed in metal and sealed against contact with the atmosphere. Thus, they can be handled, stored and shipped in complete safety. Also, they can be compacted to form sheet, strip, rods, or briquettes. For example, metal enclosed phosphorus particles which contained 78.7% nickel and 20.3% phosphorus were briquetted into rondelles of cylindrical shape about 0.75 inch long and 0.75 inch in diameter by extrusion. These rondelles were hard, closely adherent and inert to the atmosphere. They could be handled, stored and shipped without degradation.

The utility of these particles is illustrated by the following test in which 100 pounds of nickel coated phosphorus particles were compacted into rondelles which were heated to about 430° C. At this temperature a strongly exothermic reaction took place which increased the temperature spontaneously to about 1100° C. at which temperature complete alloying was effected. The molten product was cast into ingots which, on cooling, were analyzed. Two so-formed ingots contained respectively 80.4% nickel and 18.6% phosphorus and 78.6% nickel and 19.0% phosphorus.

What we claim as new and desire to protect by Letters Patent of the United States is:

1. The process of producing individual phosphorus particles completely enclosed in a coating of at least one metal selected from the group consisting of nickel and cobalt which comprises the steps of:
    (a) dispersing elemental phosphorus particles having a melting point above about 90° C. in a solution which contains at least one metal selected from the group consisting of nickel and cobalt in the form of a metal salt dissolved in the solution and at least about 0.01 gram per litre of a member selected from the group consisting of anthraquinone, substituted anthraquinone, benzoquinone, naphthoquinone, ortho- and para-polyhydric phenols, tannic acid and morin;
    (b) reacting the solution with a reducing gas at a temperature above about 90° C. but below the melting point of the phosphorus particles and under a partial pressure of said reducing gas above about 10 pounds per square inch;
    (c) agitating the solution;
    (d) continuing the reducing reaction to form a complete metal coating on each of the solid phosphorus particles;
    (e) terminating the reducing reaction; and
    (f) recovering phosphorus particles completely enclosed in said metal coating from the solution.

2. The process according to claim 1 in which a cationic surface active agent in amount at least about 0.1 gram per litre is added to the solution.

3. The process according to claim 1 in which a predetermined amount of phosphorus particles is dispersed in the solution and a predetermined amount of metal is dissolved in the solution and the reducing reaction is continued to produce metal coated phosphorus particles having a predetermined phosphorus to metal ratio.

4. The process of producing individual phosphorus particles completely enclosed in a coating of at least one metal selected from the group consisting of nickel and cobalt which comprises the steps of:
    (a) dispersing elemental phosphorus having a melting point above about 90° C. in a solution at a temperature below about 40° C., said solution containing at least one metal selected from the group consisting of nickel and cobalt in the form of a metal salt dissolved in the solution and at least about 0.01 gram per litre of a member selected from the group consisting of anthraquinone, substituted anthraquinone, benzoquinone, naphthoquinone, ortho- and para-polyhydric phenols, tannic acid and morin;
    (b) heating said solution in the presence of a reducing gas to a temperature above about 90° C. but below the melting point of the phosphorus particles, and under a partial pressure of said reducing gas above about 10 pounds per square inch;
    (c) agitating the solution;
    (d) continuing the reducing reaction to form a complete metal coating on each of the solid phosphorus particles;
    (e) terminating the reducing reaction; and
    (f) separating phosphorus particles completely enclosed in said metal coating from the solution.

5. The process of producing individual phosphorus particles coated with at least one metal selected from the group consisting of nickel and cobalt which comprises the steps of:
    (a) dispersing elemental phosphorus particles having a melting point above about 90° C. in a solution which contains a metal selected from the group consisting of nickel and cobalt in the form of a metal salt dissolved in the solution, said phosphorus being provided in said solution in at least about 0.5% of the total weight of phosphorus and metal, calculated in elemental form, present in the solution, and at least about 0.01 gram per litre of a member selected from the group consisting of antraquinone, substituted anthraquinone, benzoquinone, naphthoquinone, ortho- and para-polyhydric phenols, tannic acid, and morin;
    (b) reacting the solution with a reducing gas at a temperature above about 90° C. but below the melting point of the phosphorus particles and under a partial pressure of said reducing gas above about 10 pounds per square inch;
    (c) agitating the solution;
    (d) continuing the reducing reaction to form a complete metal coating on each of the solid phosphorus particles and produce metal coated phosphorus particles in which the phosphorus content is greater than about 0.5% by weight;
    (e) terminating the reducing reaction; and
    (f) recovering phosphorus particles enclosed in a coating of said metal coating from the solution.

6. The process of producing individual phosphorus particles coated with at least one metal selected from the group consisting of nickel and cobalt which comprises the steps of:
    (a) dispersing elemental phosphorus particles having a melting point above about 90° C. in a solution which contains a metal selected from the group consisting of nickel and cobalt in the form of a metal salt dissolved in the solution, said particles being provided in said solution in amount within the range of from about 0.5% to about 40% of the total weight of phosphorus and metal, calculated in elemental form, present in the solution, and at least about 0.01 gram per litre of a member selected from the group consisting of anthraquinone, substituted anthraquinone, benzoquinone, naphthoquinone, ortho- and para-polyhydric phenols, tannic acid, and morin;

(b) reacting the solution with a reducing gas at a temperature above about 90° C. but below the melting point of the phosphorus particles and under a partial pressure of said reducing gas above about 10 pounds per square inch;
(c) agitating the solution;
(d) continuing the reducing reaction to form a complete metal coating on each of the solid phosphorus particles in which the phosphorus content is within the range of from about 0.5% to about 40% by weight;
(e) terminating the reducing reaction; and
(f) recovering phosphorus particles enclosed in a coating of said metal coating from the solution.

References Cited by the Examiner
UNITED STATES PATENTS

| | | | |
|---|---|---|---|
| 1,880,538 | 10/1932 | Waggaman et al. | 23—223 |
| 2,853,401 | 9/1958 | Mackiw et al. | 117—100 |
| 3,070,982 | 1/1963 | McGowan | 117—5.3 X |

WILLIAM D. MARTIN, *Primary Examiner.*

MAURICE A. BRINDISI, *Examiner.*